United States Patent
Hsieh et al.

(10) Patent No.: US 7,318,231 B2
(45) Date of Patent: Jan. 8, 2008

(54) FIXING MECHANISM BETWEEN CORE AND COVER OF PERIPHERAL STORAGE DEVICE

(75) Inventors: Hung-Ming Hsieh, Taipei (TW); Jen-Chen Wu, Taipei (TW)

(73) Assignee: Micro-Star Int'l Co., Ltd., Jhonghe (TW)

( * ) Notice: Subject to any disclaimer, the term of this patent is extended or adjusted under 35 U.S.C. 154(b) by 855 days.

(21) Appl. No.: 10/747,941

(22) Filed: Dec. 31, 2003

(65) Prior Publication Data

US 2004/0264944 A1  Dec. 30, 2004

(30) Foreign Application Priority Data

Jun. 26, 2003  (TW) ............................... 92211671 U

(51) Int. Cl.
*G11B 33/02* (2006.01)

(52) U.S. Cl. .................................... 720/657

(58) Field of Classification Search ................ 720/657, 720/653, 600; 361/685
See application file for complete search history.

(56) References Cited

U.S. PATENT DOCUMENTS 6,782,546 B2 * 8/2004 Kato et al. .................. 720/653

* cited by examiner

*Primary Examiner*—Angel Castro
(74) *Attorney, Agent, or Firm*—Birch, Stewart, Kolasch & Birch, LLP

(57) ABSTRACT

A fixing mechanism for use in a peripheral storage device having a cover and a core, includes a first hook slip element on the cover and a second hook slip element on the core. The first hook slip element is formed with a bending part and an extension part. The second hook slip element is formed with a first step part on which the bending part rests and a hook slip part for the extension part to pass therethrough to be engaged with the hook slip part, such that the cover and the core are hooked together in a way that movement of the cover in both vertical and horizontal directions is restricted with respect to the core.

7 Claims, 11 Drawing Sheets

US 7,318,231 B2

FIXING MECHANISM BETWEEN CORE AND COVER OF PERIPHERAL STORAGE DEVICE

This Nonprovisional application claims priority under 35 U.S.C. § 119(a) on Patent Application No(s). 092211671 filed in Taiwan, R.O.C. on Jun. 26, 2003, the entire contents of which are hereby incorporated by reference.

FIELD OF THE INVENTION

The present invention relates to fixing mechanisms between cores and covers of peripheral storage devices, and more particularly, to a hook slip structure used to fix the core and cover together without the use of tools or screws.

BACKGROUND OF THE INVENTION

As time evolves, the trend for electronic devices has become to provide devices with characteristics such as small, light weighted and "mobile". To this end, peripheral storage devices are also required to possess the above features, especially CD (compact disc) player or slim-type CD player which are standard equipment for electronic devices such as computers. The main difference between a traditional CD player and a slim-type CD player is that the latter has a smaller volume and weight and thus is more suitable for miniaturized electronic devices such as notebook computers. The slim-type CD player is more in line with the new generation product trend, such that it is gradually superseding the tradition CD player.

A common peripheral storage device is shown in FIG. 7, for example of a slim-type CD player 10 comprising a mount 101 with top cover 101a and bottom cover 101b to form a space when the top cover 101a and bottom cover 101b are assembled to the mount 101. Within the space, a tray 103 is provided comprising a core 103a, a read/write head 103b connected to the core 103a and for reading from or writing to a CD, and a principal-axis motor 103c for rotating the CD.

A protective mechanism is normally formed on the core 103a to protect the read/write head 103b, the principal-axis motor 103c and other elements in the core 103a from exposure to the environment and ensure their proper operation. As shown in FIGS. 8 and 9, a cover 105 is disposed on the core 103a. The cover 105 is a thin metal sheet (about 0.3 mm thick) with a bent extension 105a, and the cover 105 is installed on the core 103a by stretching the extension 105a from a side of the core 103a to a lower surface of the core 103a for fixation. Since the slim-type CD player is small in size, clearance between the cover 105 and the read/write head 103b is only 0.7 mm to 0.8 mm vertically.

However, since the above fixing mechanism is operated only by hooking the extension 105a of the cover 105 to the core 103a, the very thin cover 105 may easily be deformed during transportation or manufacturing processes and causes installation gaps. As shown in the circle of FIG. 9, a gap e is formed between the extension 105a and the cover 103a. Since the slim-type CD player is featured by its small size, and the clearance (sum of gap d and gap e in FIG. 9) between the extension 105a of the cover 105 and the read/write head 103b is small; when there is a gap e, the gap d must be consequently reduced.

Besides formation of the installation gap e, the above fixing mechanism also leads to decrease in the gap d making the read/write head 103b when moving back and forth interfere with the cover 105 and its extension 105a. Moreover, this conventional fixing mechanism of hooking the extension 105a of the cover 105 to the core 103a only provides single-direction fixation i.e. vertical fixation. During the processes of manufacture, transportation or other conditions that cause horizontal displacement, the fixation is not strongly secured and may be damaged in case of the cover 105 being deformed.

To solve the disadvantages of the above fixing mechanism, a scheme of binding the cover and the core with adhesive tapes is proposed to enhance the fixation in-between. However, such a scheme consumes a huge amount of tapes making the manufacturing costs increased, and an extra procedure for sticking the tapes increases the manufacturing time and also the manufacturing and installation costs. Moreover, if the cover is deformed during the manufacturing processes, the tapes attached to the cover would become uneven and may fall off due to heating in the manufacturing, testing and operating stages. As a result, the fixation effect can not be enhanced, and even worse, unpredictable damage would be caused to the slim-type CD player when the tapes fall onto different parts or elements in the mount.

FIGS. 10 and 11 demonstrate another type of fixing mechanism, wherein on the core 103a' there are formed a step part 103d' and a threaded hole 103e', and a corresponding threaded hole 105b' is formed on the extension 105a' of the cover 105'. The extension 105a' is adapted to match the step part 103d', and a screw 107' is used to screw the threaded holes 103e', 105b' to connect the core 103a' and the cover 105' together. This solves the foregoing problems of forming the installation gap and falling of the adhesive tapes.

Nevertheless, in the use of the above fixing mechanism in FIGS. 10 and 11, a gap e' (FIG. 11) would be formed between the extension 105a' of the cover 105' and the read/write head 103b' due to the certain height of the screw 107'. As a result, the gap d' must be correspondingly reduced in the case of a limited space in the slim-type CD player, leading to the same problem of interference between the extension 105a' and the read/write head 103b' as described above.

Besides the interference problem, an installation tool is required for the screwing operation in the use of the fixing mechanism in FIGS. 10 and 11. This not only increases the installation time and costs, but also raises the material costs of screws.

Therefore, the problem to be solved herein is to provide a fixing mechanism for use in a peripheral storage device, which can eliminate the foregoing drawbacks and thereby allows convenient installation and usage without significantly increasing the installation and manufacturing costs.

SUMMARY OF THE INVENTION

A primary objective of the present invention is to provide a fixing mechanism between a core and a cover of a peripheral storage device, which can securely hook the core and the cover together, and restricts movement of the cover in vertical and horizontal directions with respect to the core, so as to eliminate interference of the cover with a read/write head of the core during motion of the read/write head.

Another objective of the present invention is provide a fixing mechanism between a core and a cover of a peripheral storage device, which can hook the cover to the core without the use of screws or tools, thereby providing ease and convenience in installation to users.

In order to achieve the above and other objectives, the present invention proposes a fixing mechanism for use in a peripheral storage device, for mounting a cover to a core of the peripheral storage device. The fixing mechanism comprises a first hook slip element located on the cover, and formed with a downwardly-bent first bending part and a first extension part; and a second hook slip element located on the core, the second hook slip element being formed with a first step part on which the first bending part rests, and a first hook slip part for the first extension part to penetrate therethrough to be engaged with the first hook slip part, such that the first hook slip element is coupled to the second hook slip element so as to mount the cover to the core in a manner that the combined height of the cover and the first hook slip element is equal to the thickness of the core and movement of the cover in vertical and horizontal directions is restricted with respect to the core.

The fixing mechanism according to the present invention allows its first hook slip element to hook the core and the second hook slip element to hook the cover, wherein the first hook slip element is tightly in contact with a lower surface of the core with no installation gap left between the cover and the core. As a result, the prior-art problems caused by the presence of installation gap for example interference between the cover and the read/write head can be eliminated, and the first and second hook slip elements can be formed simultaneously with the core and cover, thereby not increasing the manufacturing costs. Besides, the use of first and second hook slip elements for fixing the cover and core together does not require extra screws and tools and thus saves the material costs.

In another aspect of the present invention, on the first hook slip element of the fixing mechanism there are formed an upwardly-bent second bending part and a second extension part extending away from the second bending part. The bent height of the second bending part is equal to the thickness of the core. A second hook slip part of the second hook slip element is correspondingly hooked to the second extension part to securely fix the core and the cover together, and a lower surface of the cover is flush with the lower surface of the core without forming any installation gap.

In a further aspect of the present invention, on the first hook slip element of the fixing mechanism there are formed an extension part that can rest on the core and a hook slip part with an inverted-hook shape that is bent from the extension part, and the second hook slip element is formed with an opening for the hook slip part to pass therethrough and an inverted hook part on the rim of the opening. The hook slip part is adapted to penetrate through the opening to be engaged with the inverted hook part so as to fix the cover and the core together in a manner that the lower surface of the core is flush with the lower surface of the cover and the vertical and horizontal movement of the cover is restricted with respect to the core.

BRIEF DESCRIPTION OF THE DRAWINGS

The present invention can be more fully understood by reading the following detailed description of the preferred embodiments, with reference made to the accompanying drawings, wherein.

DETAILED DESCRIPTION OF THE PREFERRED EMBODIMENTS

Preferred embodiments of a fixing mechanism for use in a peripheral storage device according to the present invention are described in detail with reference to FIGS. 1 to 6.

First Preferred Embodiment

Figure 1:
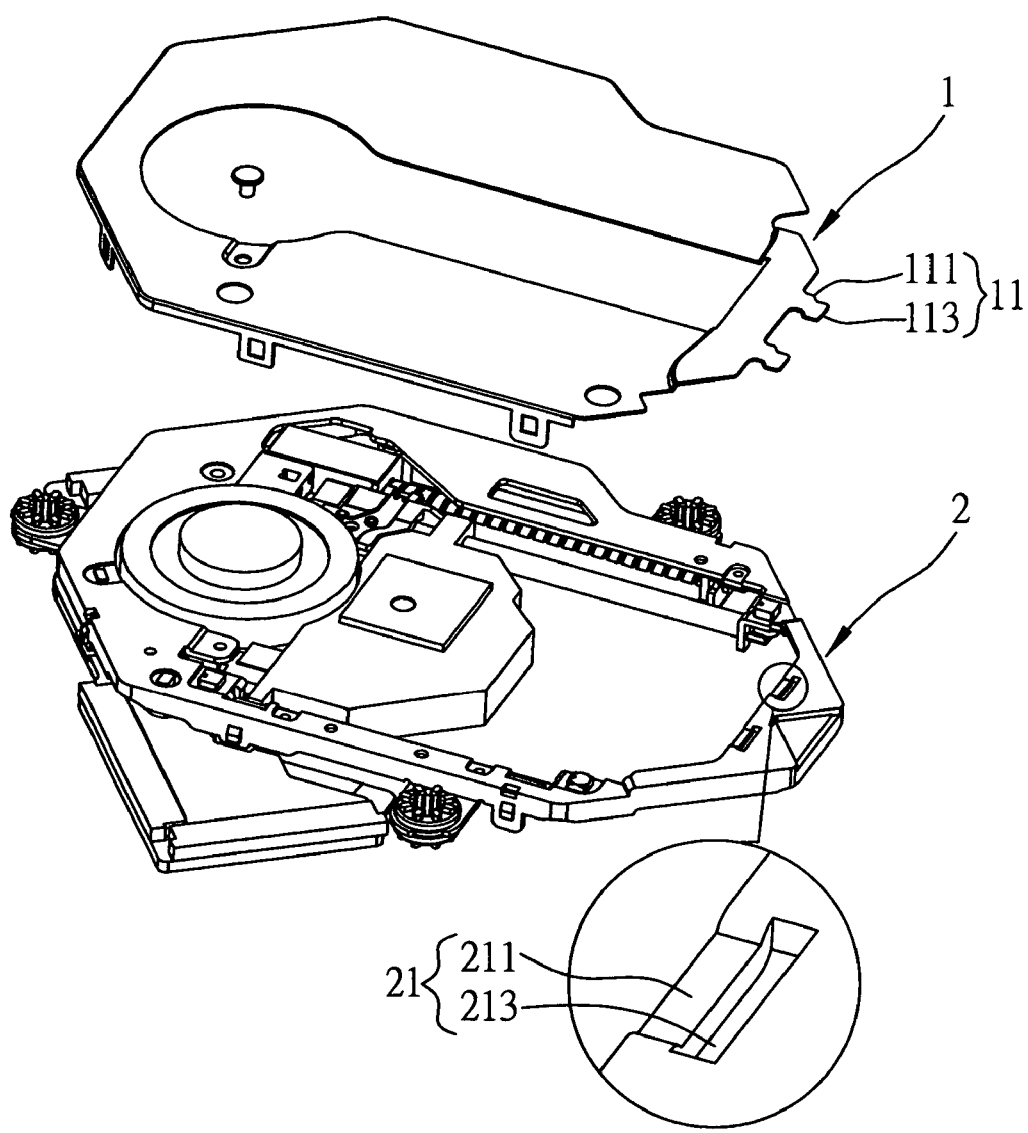
FIG. 1 is a perspective diagram showing a fixing mechanism before assembly for use in a peripheral storage device according to a first preferred embodiment of the present invention.
Figure 2:
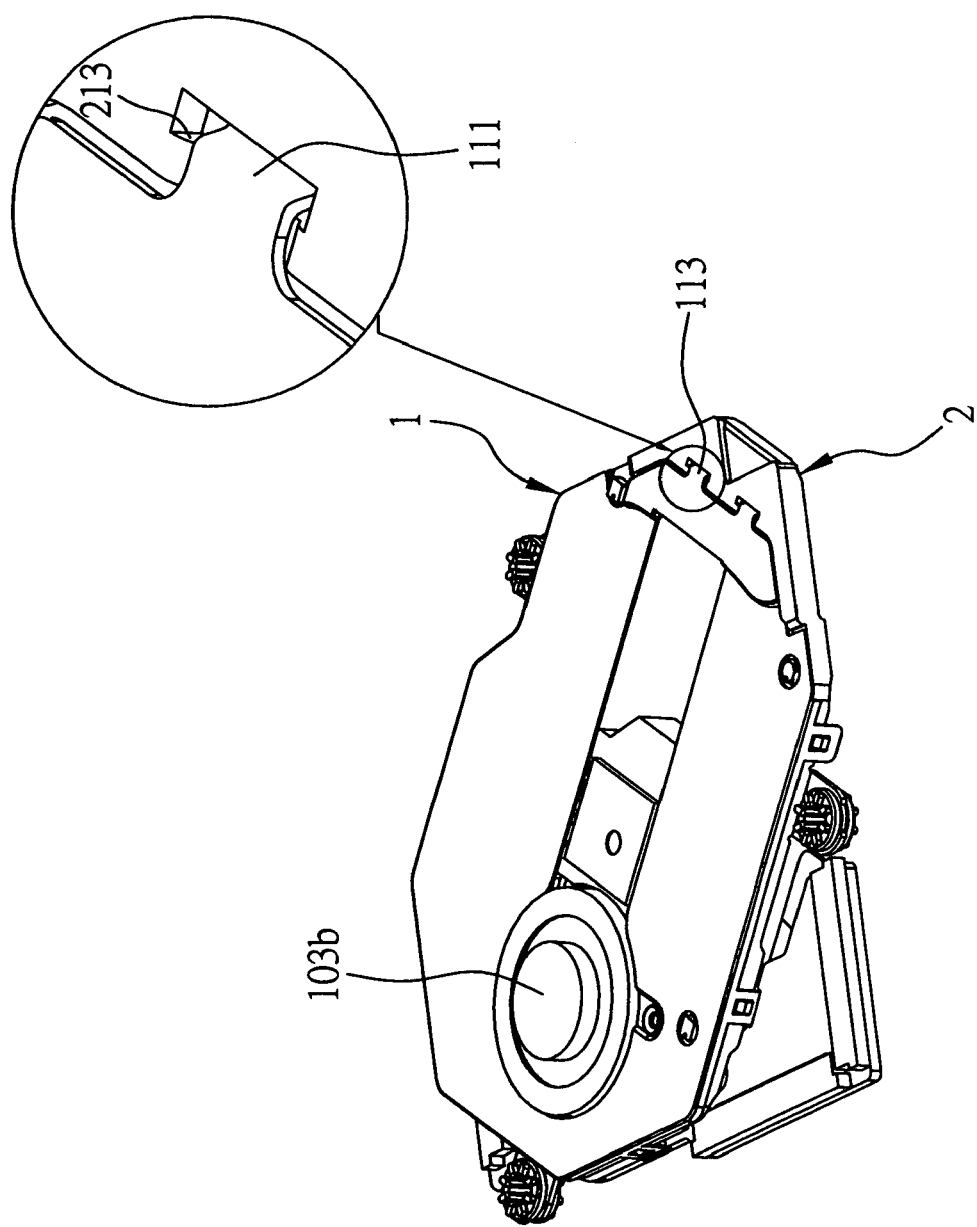
FIG. 2 is a perspective diagram showing the assembled fixing mechanism according to the first preferred embodiment of the present invention.
Figure 3:
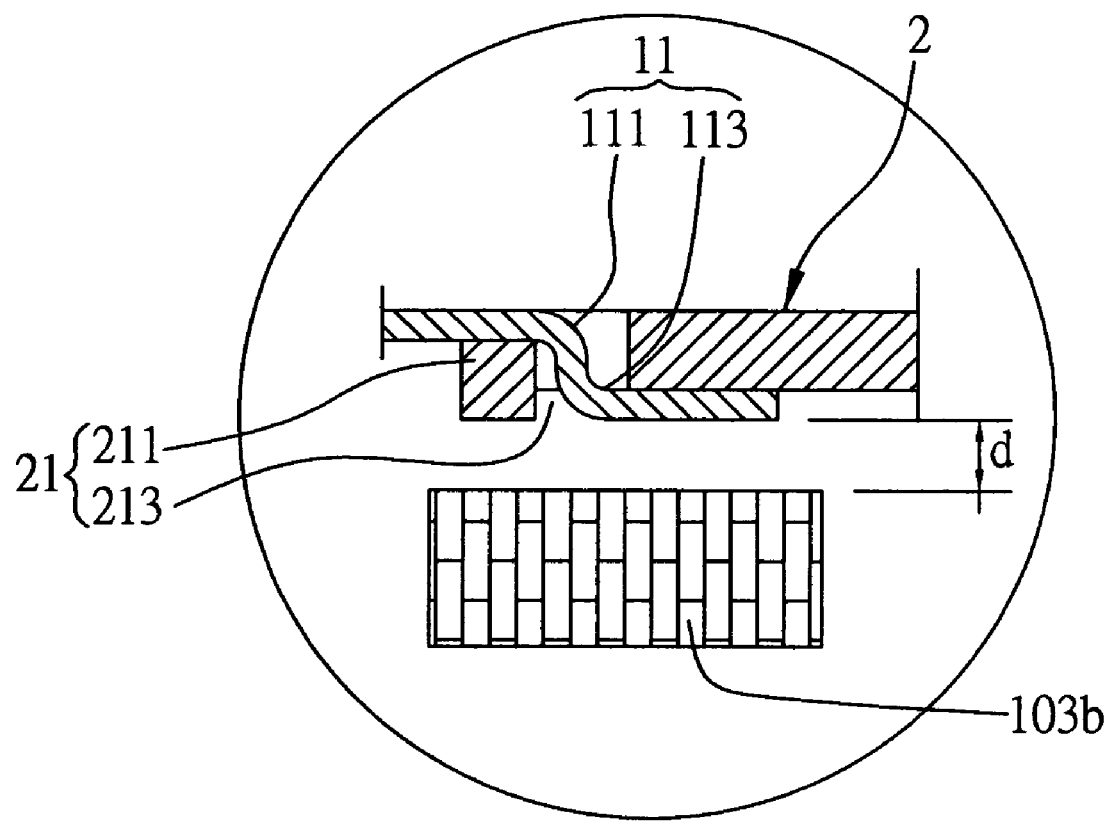
FIG. 3 is a partial cross-sectional view of the fixing mechanism according to the first preferred embodiment of the present invention.

FIGS. 1 to 3 show the fixing mechanism according to a first preferred embodiment of the present invention. As shown, the fixing mechanism is used in a peripheral storage device having a cover 1 and a core 2. The fixing mechanism comprises at least one first hook slip element 11 on the cover 1 and at least one second hook slip element 21 on the core 2. The peripheral storage device may be a slim-type CD player whose structure is known in the art. For the sake of simplicity, only the parts or elements of the slim-type CD player associated with the fixing mechanism according to the present invention are shown in the drawings and designated with the same reference numerals as illustrated in the prior art.

As shown in FIG. 1, the first hook slip element 11 is located at a side of the cover 1 and formed with a first bending part 111 that is downwardly bent by a perpendicular angle and a first extension part 113 extending toward a direction away from the first bending part 111. The first bending part 111 can be made by stamping, die-casting or other suitable technique. The first extension part 113 is used to be hooked to a lower surface of the core 2. In this embodiment, two first hook slip elements 11 are shown in the drawing. It should be understood that the quantity and location of the first hook slip elements 11 are not limited to the drawing but can be flexibly made according to practical needs.

The core 2 can be produced by stamping, die-casting, injection molding, or other suitable technique. The second hook slip element 21 can be formed simultaneously with the core 2. The stamping, die-casting or injection molding technique is conventional and thus not to be further described herein.

The second hook slip element 21 includes a first step part 211 and a first hook slip part 213, which may be formed by stamping the core 2. The first step part 211 can be for example a groove and allows the first bending part 111 to be flush with the core 2 when the first bending part 111 rests on the first step part 211. The first hook slip part 213 can be for example a opening, and allows the first extension part 113 to penetrate through the first hook slip part 213 to be hooked to the lower surface of the core 2 and flush with a lower surface of the first step part 211, such that the first extension part 113 is engaged with and embedded in the first hook slip part 213 so as to firmly couple the core 2 and the cover 1 together.

In this embodiment there are two second hook slip elements 21 located on one side of the core 2 as shown in FIG. 1. It should be understood that the shape, quantity, and location of the second hook slip elements 21 can be flexibly made without limited to the drawing, as long as they correspond to the bending part 111 and the first extension part 113 of the first hook slip element 11.

For hooking the first hook slip element 11 to the second hook slip element 21, it only requires the bending part 111 and the first extension part 113 of first hook slip element 11 to penetrate through the first step part 211 and the first hook slip part 213 of the second hook slip element 21 respectively, such that the first extension part 113 can be engaged with the first hook slip part 213, and the core 2 is assembled with the cover 1 as shown in FIG. 2. After assembly, the combined height of the cover 1 and the first hook slip element 11 is equal to the thickness of the core 2. As shown in FIG. 3, the first extension part 113 is closely in contact with the lower surface of the core 2, and flush with the lower surface of the first step part 211, with no installation gap left between the core 2 and the cover 1, such that the prior-art problems of inference in motion and damage to fixation by cover deformation can be eliminated.

The first hook slip element 11 and the second hook slip element 21 are hooked together in such a way that, when the cover 1 experiences a force in the vertical direction, the second hook slip element 21 and the first step part 211 of the core 2 restricts the vertical movement of the cover 1, and when the cover 1 experiences a force in the horizontal direction, the second hook slip element 21 and the first hook slip part 213 restricts the horizontal movement of the cover 1. Therefore, movement of the cover 1 in both vertical and horizontal directions is restricted by the second hook slip element 21 of the core 2, making fixation between the cover 1 and the core 2 secured.

Therefore, as shown in FIG. 3, a gap d between the first extension part 113 of the cover 1 and a read/write head 103b should not be affected by the prior-art installation gap. In this case, back and forth movement of the read/write head 103b would not be interfered by the cover 1 and the first extension part 113, such that there is no need for an extra procedure of sticking adhesive tapes or using screws in the prior art to facilitate the fixation, thereby not increasing the manufacturing time and costs, and also eliminating the undesirable effects caused by falling of the adhesive tapes on the manufacturing processes.

In conclusion, by the hooking or engagement between the first hook slip element 11 and the second hook slip element 21 in the use of the fixing mechanism according to the present invention, the core 2 and the cover 1 can be firmly coupled together, and the vertical and horizontal movement of the cover 1 is restricted with respect to the core 2, which would beneficially eliminate the interference between the cover and the read/write head and not increase the material and manufacturing costs as well as avoid undesirable effects on the manufacturing processes.

Second Preferred Embodiment

Figure 4:
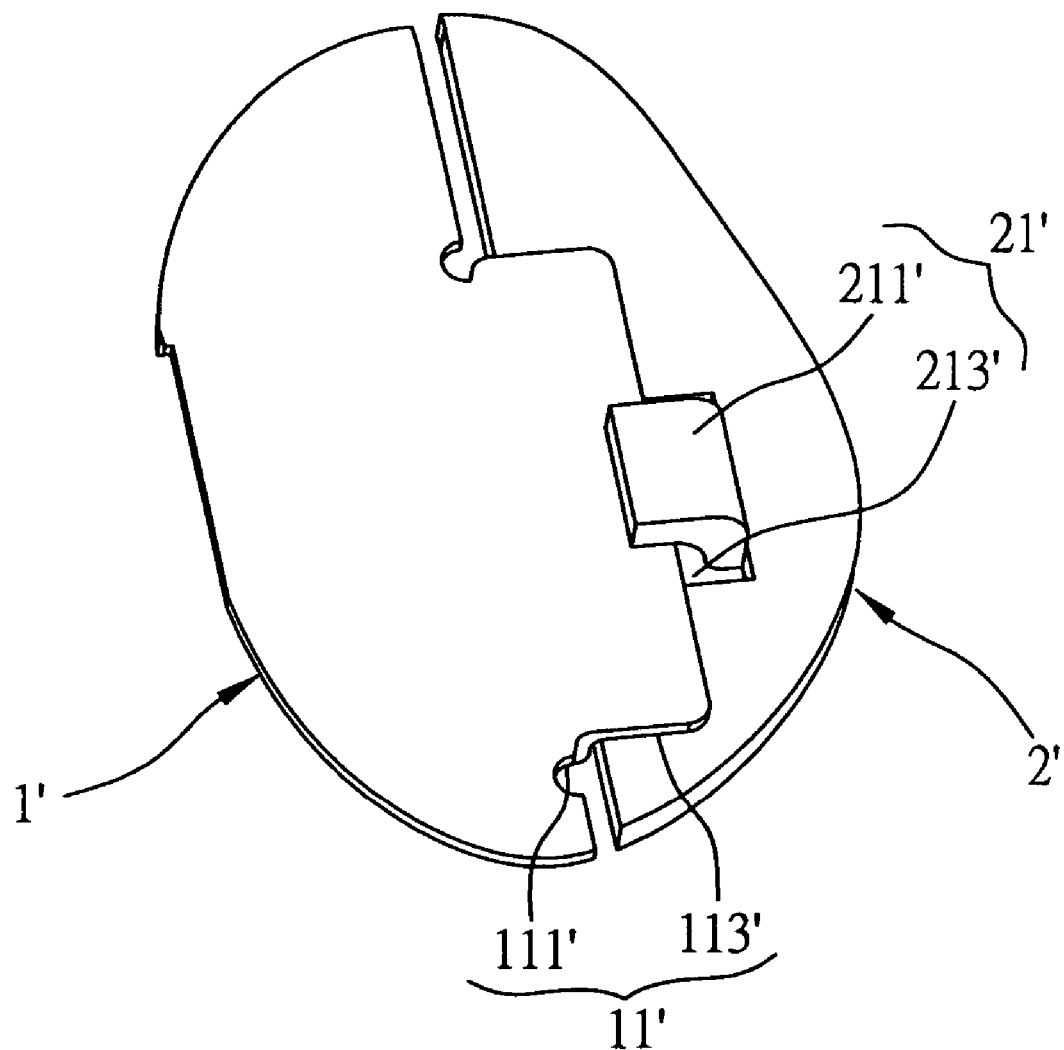
FIG. 4 is a partial top view of the assembled fixing mechanism according to a second preferred embodiment of the present invention.
Figure 5:
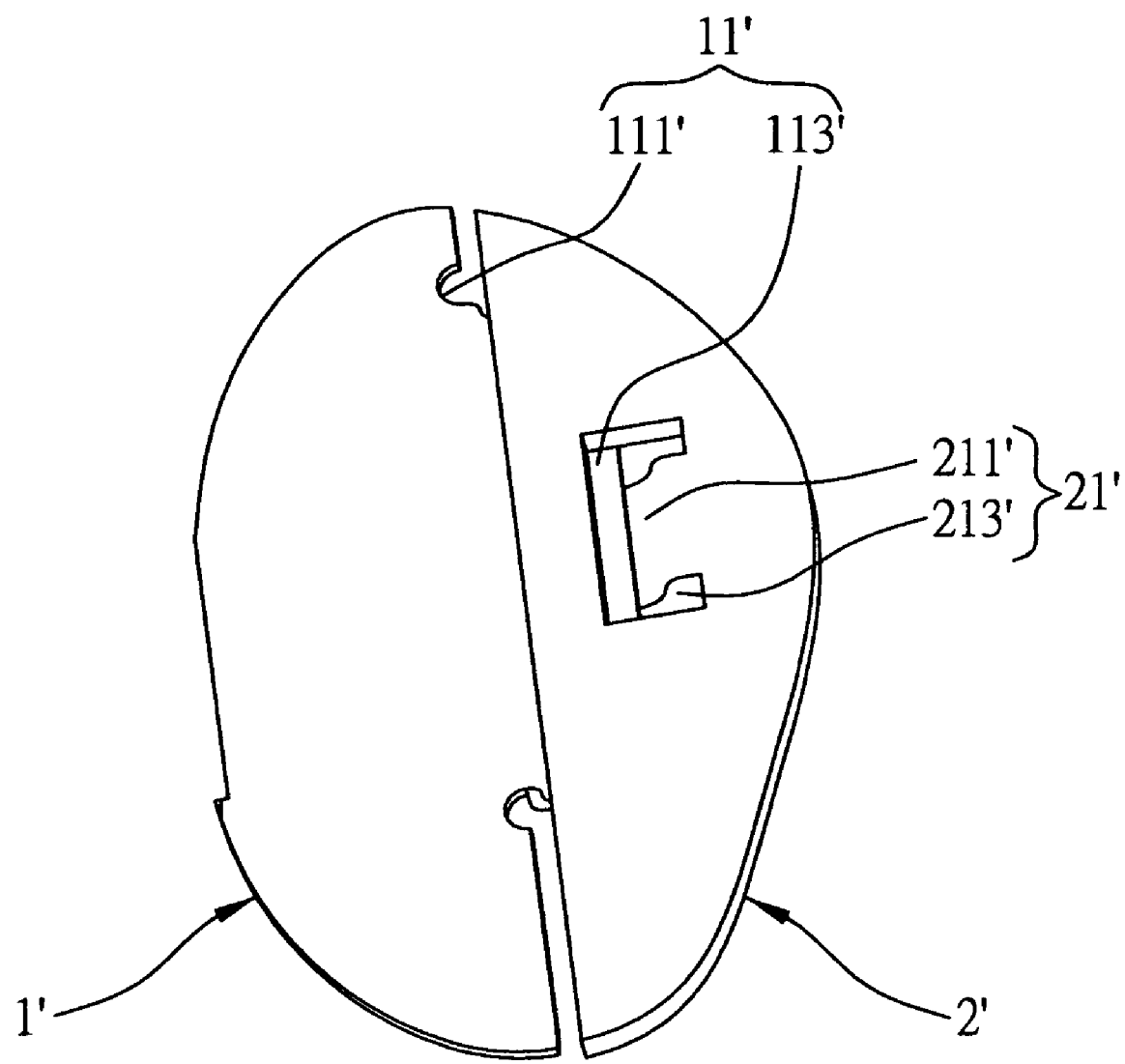
FIG. 5 is a partial bottom view of the assembled fixing mechanism according to the second preferred embodiment of the present invention.

FIGS. 4 and 5 show the fixing mechanism according to a second preferred embodiment of the present invention. As shown, this fixing mechanism comprises a first hook slip element 11' on a cover 1' and a second hook slip element 21' on a core 2'. Most part of the structure and operation of this fixing mechanism is the same as the foregoing fixing mechanism of the first embodiment and thus not to be further repeated here; only the different part of structure and function is discussed as follows for the fixing mechanism of this second embodiment.

The fixing mechanism of the second embodiment differs from that of the first embodiment in that, the first hook slip element 11' is formed with second bending part 111' upwardly bent by a perpendicular angle and a second extension part 113' extending toward a direction away from the second bending part 111'. The bent height of the second bending part 111' is equal to the thickness of the core 2', and the second extension part 113' is used to be hooked to an upper surface of the core 2'. The second hook slip element 21' is formed with a second hook slip part 211' corresponding to the second extension part 113', such that the second extension part 113' of the cover 1' can be inserted into and engaged with the second hook slip part 211' of the core 2' so as to strongly fix the cover 1' and the core 2' together.

As shown in FIG. 5, by virtue of the bent height of the second bending part 111' equal to the thickness of the core 2', when the second extension part 113' are engaged with the second hook slip part 211' to fix the core 2' and the cover 1' together, a lower surface of the cover 1' is flush with a lower surface of the core 2' without forming any installation gap in-between, such that the prior-art problems caused by the installation gap would not occur.

In this embodiment, the second hook slip part 211' is prepared by stamping the core 2' to form a first opening 213'. The second hook slip part 211' is made of the same material as the core 2' and fabricated simultaneously with the core 2'; also the first hook slip element 11' may be manufactured simultaneously with the cover 1' for example by stamping technique, thereby not requiring extra materials and manufacturing procedures while saving the material and manufacturing costs in the use of the fixing mechanism according to the present invention.

Third Preferred Embodiment

Figure 6:
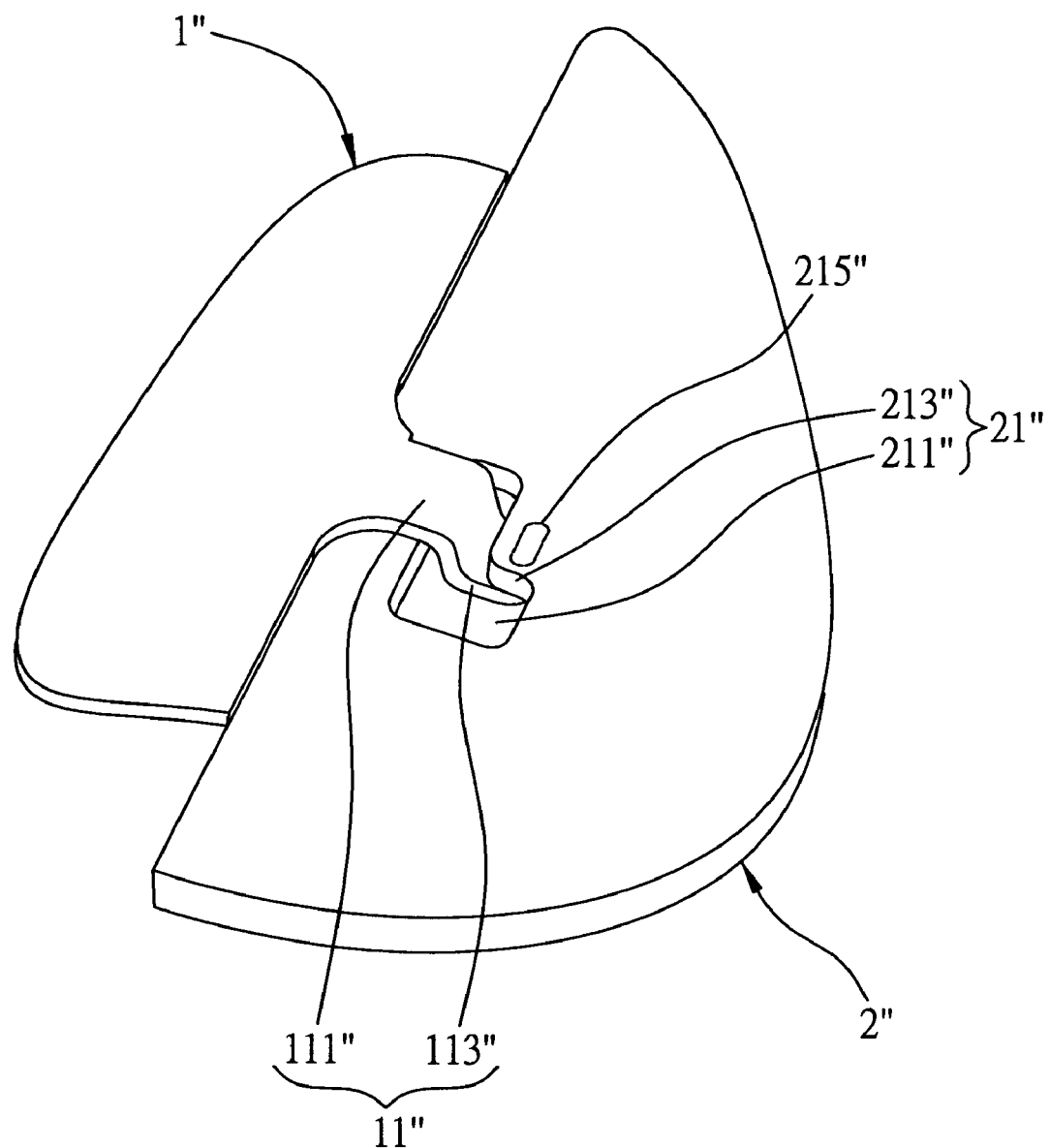
FIG. 6 is a partial top view of the assembled fixing mechanism according to a third preferred embodiment of the present invention.
Figure 7:
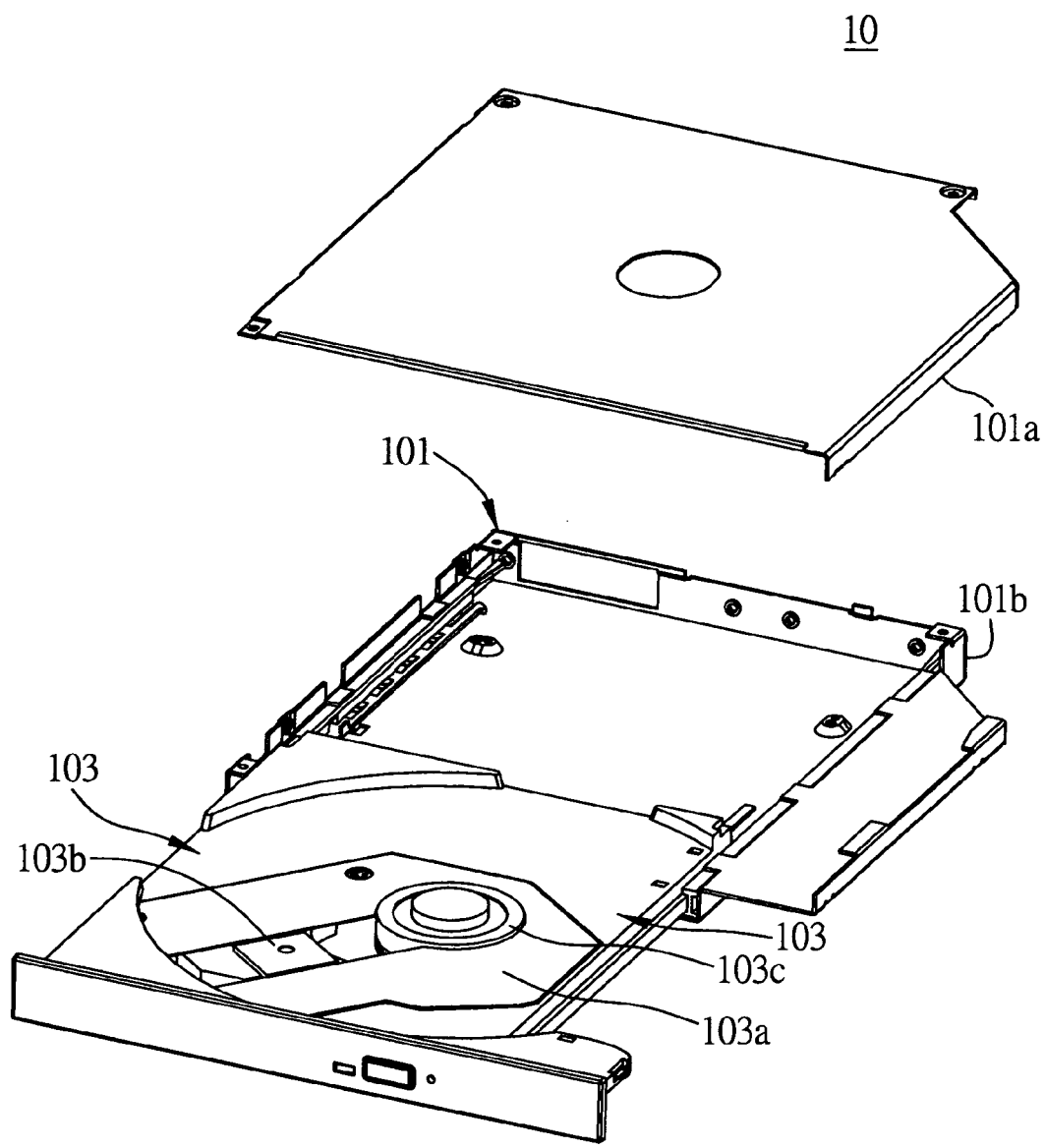
FIG. 7 (PRIOR ART) is a perspective diagram showing a conventional peripheral storage device.
Figure 8:
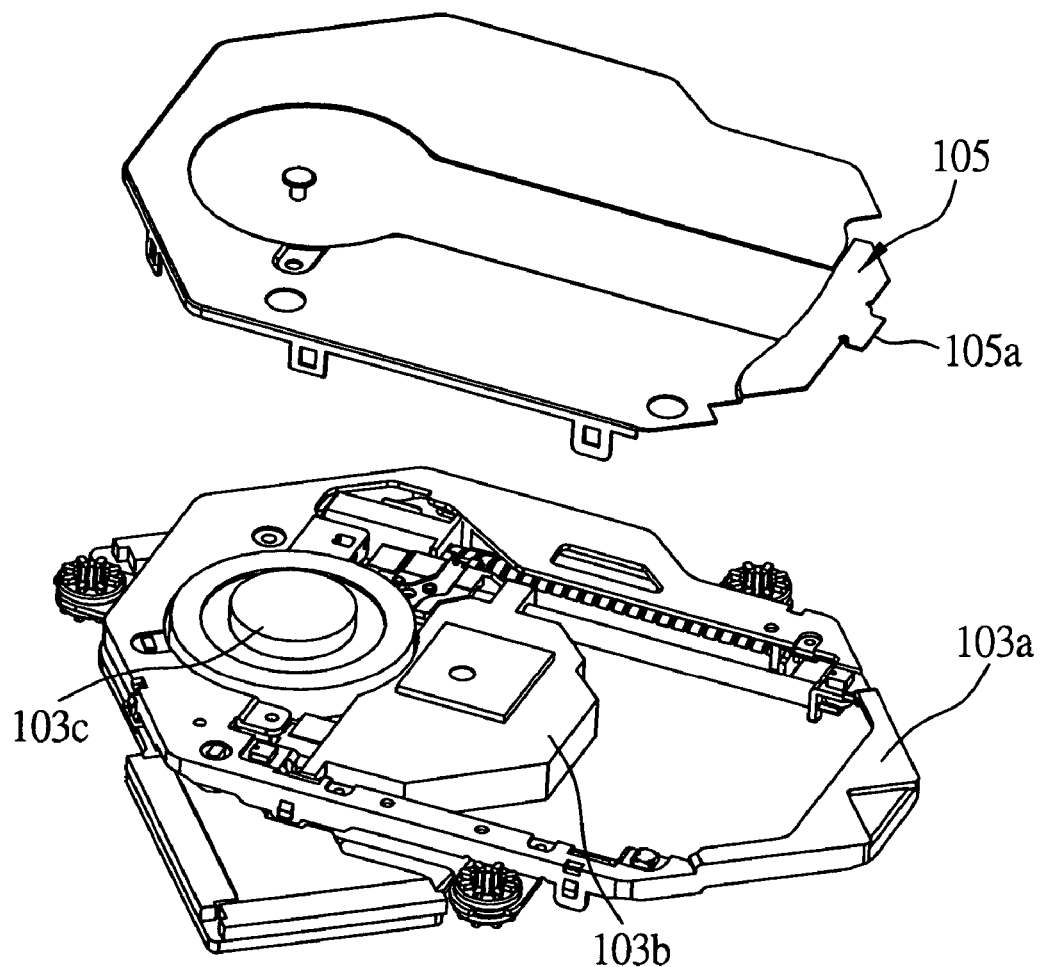
FIG. 8 (PRIOR ART) is a perspective diagram showing a conventional fixing mechanism before assembly for use in a peripheral storage device.
Figure 9:
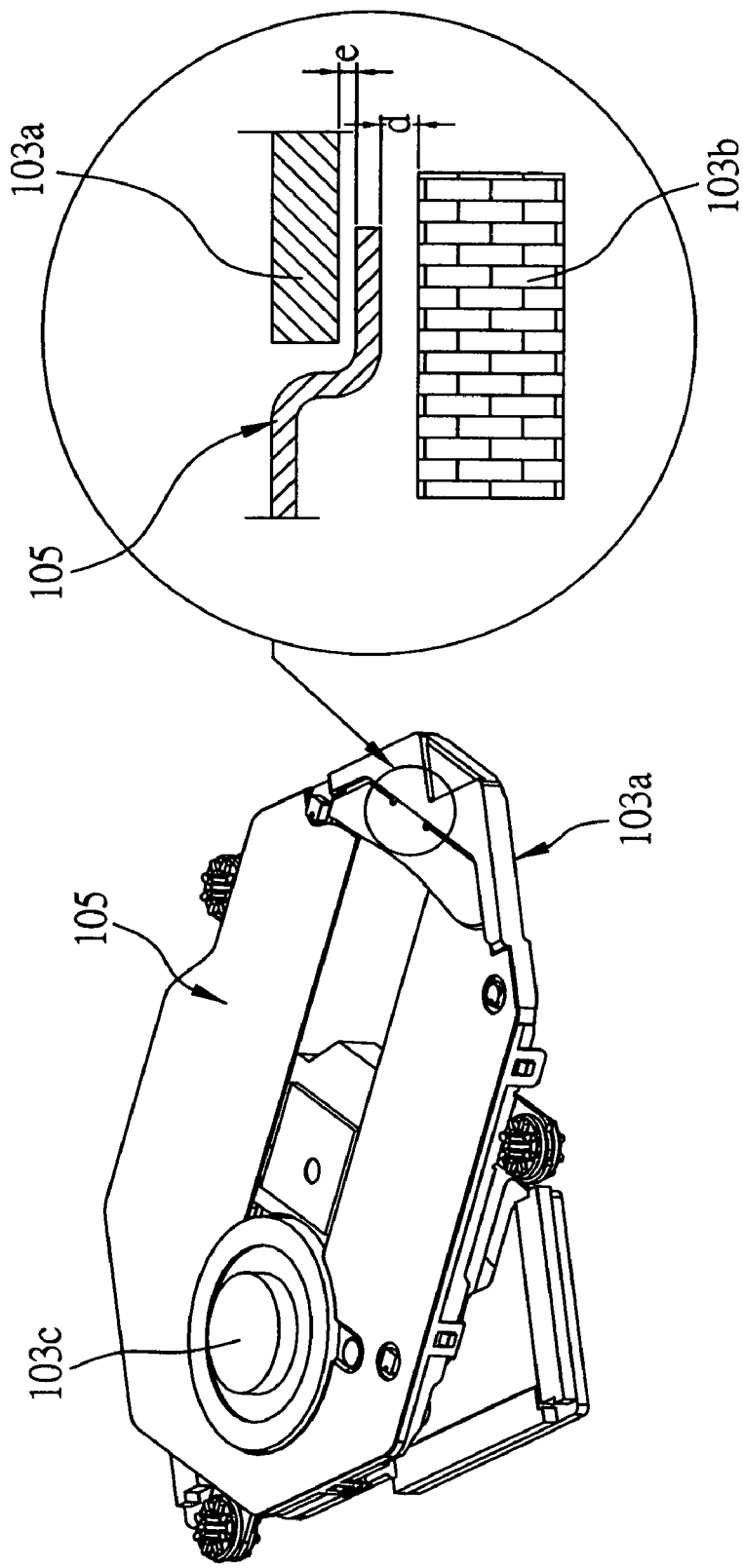
FIG. 9 (PRIOR ART) is a schematic diagram showing the assembled fixing mechanism of FIG. 8, with a circled partial cross-sectional view of the fixing mechanism.
Figure 10:
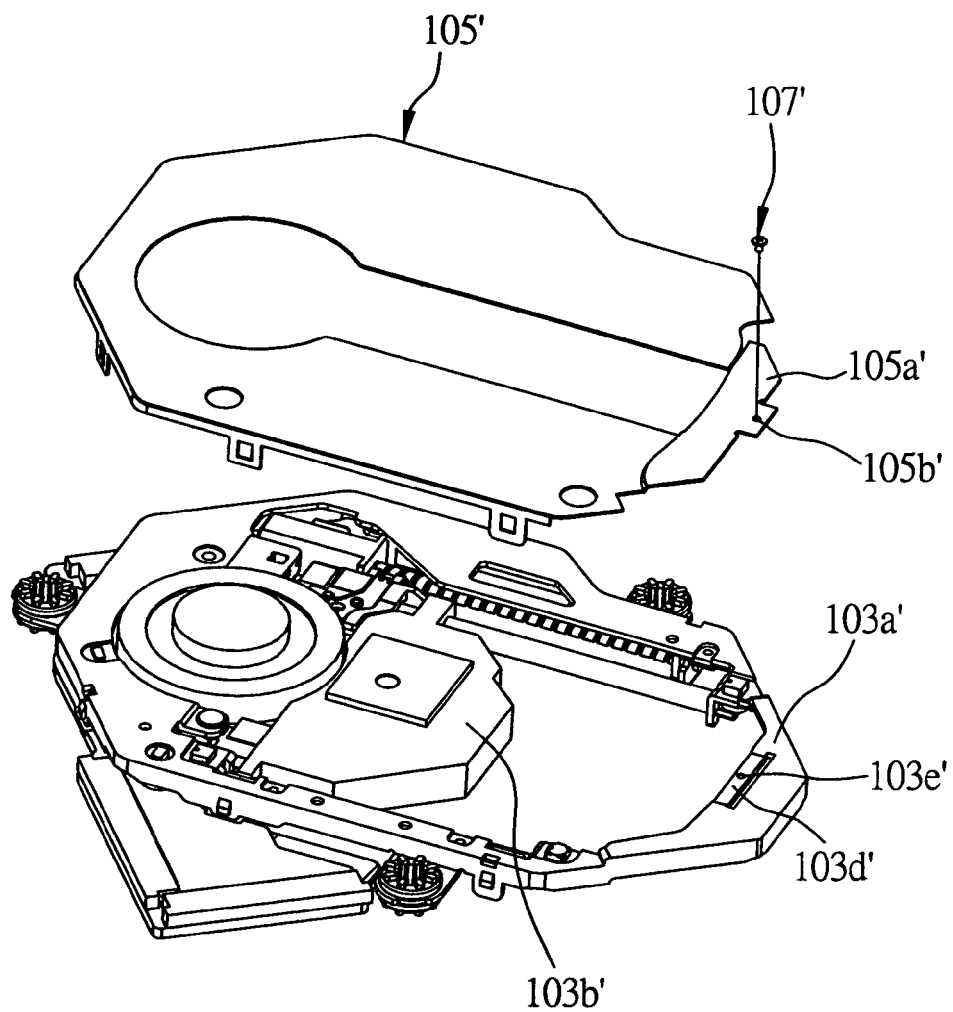
FIG. 10 (PRIOR ART) is a perspective diagram showing another conventional fixing mechanism before assembly for use in a peripheral storage device.
Figure 11:
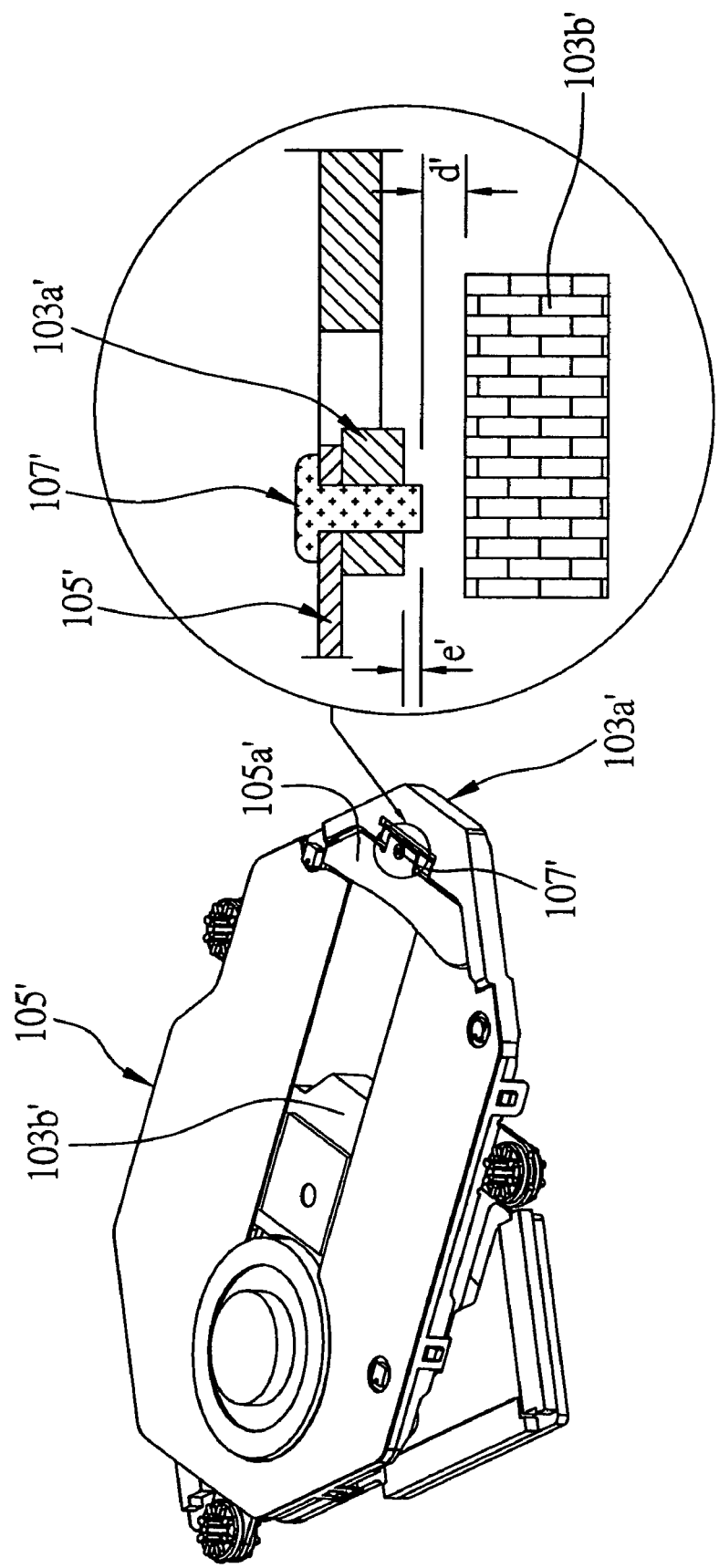
FIG. 11 (PRIOR ART) is a schematic diagram showing the assembled fixing mechanism of FIG. 10, with a circled partial cross-sectional view of the fixing mechanism.

FIG. 6 shows the fixing mechanism according to a third preferred embodiment of the present invention. As shown, this fixing mechanism comprises a first hook slip element 11" on a cover 1" and a second hook slip element 21" on a core 2". Most part of the structure and operation of this fixing mechanism is the same as the foregoing fixing mechanisms of the first and second embodiments and thus not to be further repeated here; only the different part of structure and function is discussed as follows for the fixing mechanism of this third embodiment.

The fixing mechanism of the third embodiment differs from those of the first and second embodiments in that, the first hook slip element 11" is formed with a third extension part 111" and a third hook slip part 113" that extends from the third extending part 111" and is bent to form an inverted-hook shape. The second hook slip element 21" is stamped to form a second opening 211" for the third hook slip part 113" to penetrate therethrough and an inverted hook part 213" on the rim of the second opening 211".

The second opening 211" is of a L shape and sufficient to accommodate the third hook slip part 113". A concave step part 215" is formed on a lower surface of the inverted hook part 213" to be hooked with the third hook slip part 113", wherein a region of the third hook slip part 113" hooked to the concave step part 215" is flush with the lower surface of the core 2" to control the occurrence of the installation gap. By the fixation and engagement between the first hook slip element 11" and the second hook slip element 21", the vertical and horizontal movement of the cover 1" mounted to the core 2" would be restricted with respect to the core 2".

The shape of the inverted hook part 213" and the third hook slip part 113" is not limited to FIG. 6 of this embodiment but is flexibly made as long as the third hook slip part 113" can be hooked to the concave step part 215" of the inverted hook part 213".

Besides the L shape, the second opening 211" can flexibly have a semicircular, triangular or other suitable shape as long as it allows the third hook slip part 113" to pass therethrough and hooks the third hook slip part 113" by the inverted hook part 213" formed on the rim of the second opening 211".

Moreover, the quantity and location of the first hook slip element 11" and the corresponding hook slip element 21" are not limited to those shown in FIG. 6 of this embodiment but can be provided in a flexible number and different locations to enhance the fixation between the core 2" and the cover 1".

In conclusion, the fixing mechanism for use in a peripheral storage device according to the present invention yields significant benefits. The fixing mechanism comprises corresponding hook slip elements respectively located on a core and a cover of the peripheral storage device, which are used to firmly hook and couple the core and the cover together in a manner that, a lower surface of the core is flush with the cover without forming any installation gap and the vertical and horizontal movement of the cover is restricted with respect to the core, such that the numerous prior-art problems caused by the installation gap for example interference of the cover with the read/write head during back and forth motion of the read/write head can be eliminated.

Further, the use of hook slip elements to fix the core and the cover together does not require screws and tools are not required and can be manually operated by hands, thereby reducing the material costs and providing ease and convenience in assembly.

In the fixing mechanism, the hook slip elements and other associated parts can be formed simultaneously with the core and cover during manufacture, such that the manufacturing costs are saved and no extra manufacturing processes are required, making the fixing mechanism broadly applicable in the industry.

Consequently, the fixing mechanism according to the present invention desirably solves the prior-art problems associated with the presence of installation gap and avoids increase in the material and manufacturing costs, making the assembly of the cover and core through the use of the fixing mechanism easy and convenient to implement, and also strongly secure the fixation and engagement between the cover and core such that the cover is restricted from vertical and horizontal movement with respect to the core.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A fixing mechanism for use in a peripheral storage device, for mounting a cover to a core of the peripheral storage device, comprising:
    a first hook slip element located on the cover, and formed with a bending part and an extension part; and
    a second hook slip element located on the core, the second hook slip element being formed with a step part on which the bending part rests, and a hook slip part for the extension part to penetrate therethrough to be engaged with the hook slip part, such that the first hook slip element is coupled to the second hook slip element so as to mount the cover to the core in a manner that the combined height of the cover and the first hook slip element is equal to the thickness of the core and movement of the cover in vertical and horizontal directions is restricted with respect to the core.

2. The fixing mechanism of claim 1, wherein the bending part is bent downwardly by a perpendicular angle.

3. The fixing mechanism of claim 1, wherein the extension part extends toward a direction away from the bending part.

4. The fixing mechanism of claim 1, wherein the extension part is in contact with a lower surface of the core and is flush with a lower surface of the step part.

5. The fixing mechanism of claim 1, wherein the step part and the hook slip part are formed by stamping of the core.

6. The fixing mechanism of claim 1, wherein the step part is a groove.

7. The fixing mechanism of claim 1, wherein the hook slip part is an opening.

* * * * *